Sept. 8, 1925.                                                                1,552,649
J. S. ROSS
PROTECTION OF SEEDS AND CROPS FROM THE ATTACKS OF INSECTS AND BIRDS
Filed Aug. 22, 1922                   2 Sheets-Sheet 1

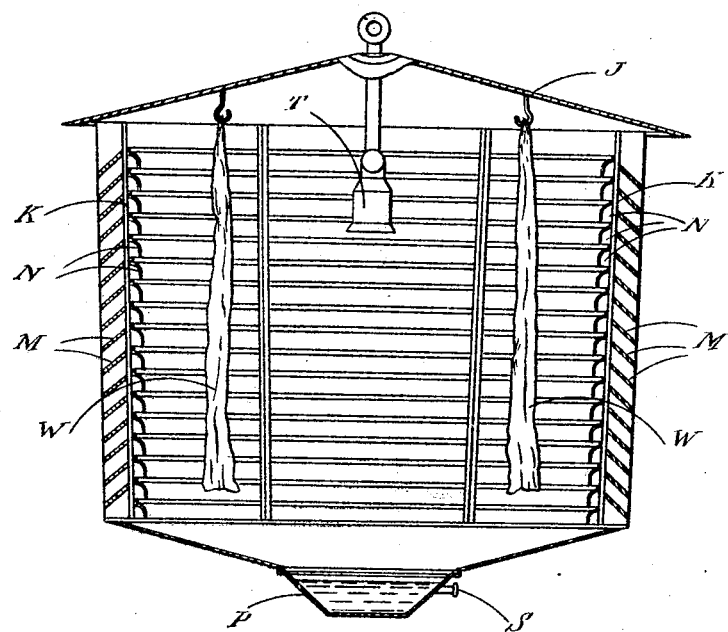

Patented Sept. 8, 1925.

1,552,649

UNITED STATES PATENT OFFICE.

JACOB SMITH ROSS, OF PUTNEY, ENGLAND.

PROTECTION OF SEEDS AND CROPS FROM THE ATTACKS OF INSECTS AND BIRDS.

Application filed August 22, 1922. Serial No. 583,615.

*To all whom it may concern:*

Be it known that I, JACOB SMITH ROSS, a subject of the King of Great Britain, residing at 16ª Blackett Street, Putney, in the county of London, England, have invented certain new and useful Improvements in or Relating to the Protection of Seeds and Crops from the Attacks of Insects and Birds, of which the following is a specification.

This invention relates to the protection of seeds and crops from the attacks of winged insects and birds, and although of general utility for the said purposes, is particularly suitable for protecting cotton plantations from attacks of the boll weevil.

According to this invention brushes are caused to travel on wire suspended above the land containing the seeds or crops to be protected, and in combination with such brushes I may use a travelling cage provided with devices adapted to destroy insects or frighten birds. The cage for the former purpose may contain odoriferous material attractive to insects and adapted to poison or detain them, or for the latter purpose may carry intermittently detonating devices; or the same apparatus may be employed for frightening birds in the day-time and destroying insects at night.

In order that the said invention may be clearly understood and readily carried into effect, the same will now be described with reference to the accompanying drawings and diagrams in which:—

Figure 7 is a cross section of the cage.

Figure 1:
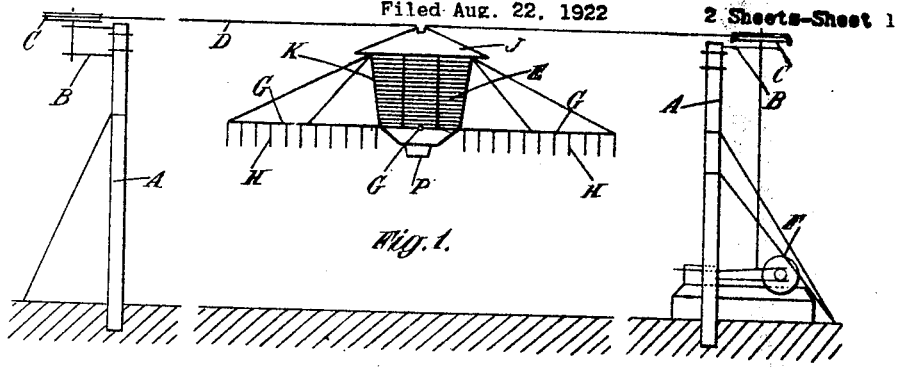
Figure 1 represents in elevation an arrangement of posts and a wire supporting the travelling cage.
Figure 2:
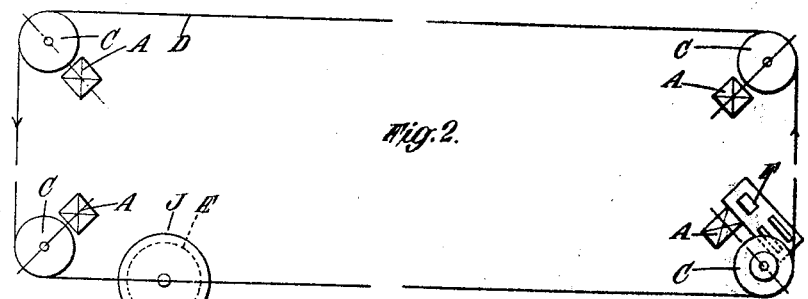
Figure 2 represents in plan the same parts as are shown in Figure 1.
Figure 3:
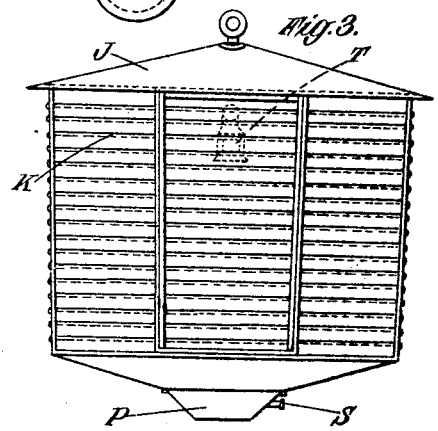
Figure 3 is an elevation of the cage detached.
Figure 5:
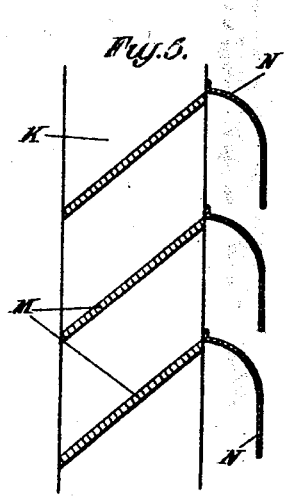
Figure 5 represents in cross section a portion of the wall of the cage.
Figure 4:
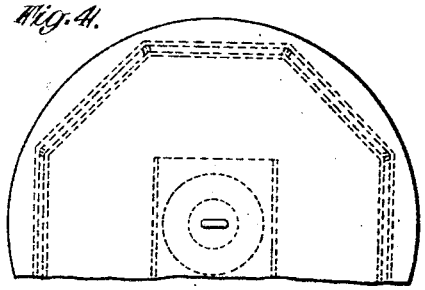
Figure 4 is a plan of the cage.
Figure 6:
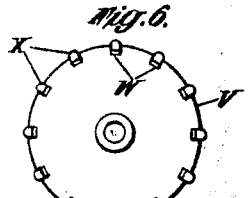
Figure 6 illustrates a detail hereinafter mentioned.

In an embodiment of this invention a number of upright posts A preferably of metal, are provided at the sides and corners of a field of cotton, tea or other crop, at the tops of which posts are brackets B, carrying horizontally disposed pulleys C, around which pulleys passes an endless wire D, on which the cage E can travel, this wire D being arranged in a zig-zag or other manner so as to enable the cage E to approach all portions of the field in turn. The wire D may be fixed and the cage E may be caused to travel over it by means of clockwork attached to the cage actuating track wheels or rollers engaging the wire, but preferably an electro-motor or other prime mover F is arranged to rotate continuously one or more of the pulleys so as to cause the wire to travel, the cage being in this case secured to one part of this wire. The speed may be for example 5 feet per minute. Near the base of the cage are four or other number of radial rods G each provided with a row or rows of down-turned bristles or fine metal wires H, which must be carried at such a height as to brush against the leaves or branches of the plants and shake them so as to disturb the insects, which then rise above the plants. The brushes H must be of such a flexible nature as to avoid tearing or doing other damage to the plants; they may for example comprise strings, strips of cloth or fine chains. The cage may be made of aluminium, cane or other suitable material and may be of octagonal shape with a sloping roof J projecting beyond its walls K, the said walls consisting of louvres M (see Figure 5) affording ready access for insects to the interior of the cage and baffles N for discouraging their exit. Below these walls is a tapering or approximately conical bottom or tank P containing water with a thin film of paraffin. Within the cage are suspended several strips of sacking or the like saturated with any suitable liquid or coated with some sticky substance which gives off an odour attractive to insects, but which is poisonous to them or holds them until they drop into the tank at the bottom of the cage where they are asphyxiated. This tank may be in the form of a drawer provided with a handle S, so that it can be pulled out, emptied of the dead insects, and replenished with water and paraffin as often as may be required.

The rods G, or strips of any suitable material attached to the outside of the cage, may also be coated with an adhesive substance to receive and retain insects which do not enter the cage.

A lamp T may be placed within the cage, the light of which co-operates in attracting the insects besides enabling an observer to ascertain the position of the cage at any time during the night and also whether the cage is moving.

Where the invention is applied to protect seeds or fruit from birds, the speed at which it travels is increased, and the cage may be dressed to represent a scarecrow. Inside the cage may be arranged a rotary disc V provided with peripheral notches W containing detonating caps X which are automatically struck by a trigger at any desired interval of time to produce a loud report. The intermittent action of the disc and trigger may be effected either by clockwork, or by a projection on the cage engaging a projection on one of the posts.

As the insects which lay eggs on the cotton plant, for example, usually rest on the leaves of the plant for a considerable time before beginning to lay their eggs, the periodical disturbance of the plants by means of the brushes will usually cause such insects to rise and thereby will tend to drive away the insects and keep the plantation free from their injurious larvæ, apart from the lethal effect of the cage, if such a cage be used, also the collection of dew on the plants, which chills the plants during the night, will be prevented or reduced.

The use of this invention renders it unnecessary to spray any poisonous material upon the plants or ground.

What I claim and desire to secure by Letters Patent of the United States is:—

1. In a device for the protection of crops from the attacks of winged insects and birds, the combination of a wire track suspended over the land containing such crops, brushing devices carried on said track, and automatic means for causing said brushing devices to brush over said crops.

2. In a device for the protection of crops from the attacks of winged insects and birds, a wire track suspended over the land containing such crops, a cage suspended above said crops and movable on said track, automatic means for traversing said cage, and brushing means carried by said cage to brush over said crops.

3. In a device for the protection of crops from the attacks of winged insects and birds, a wire track suspended over the land containing such crops, a cage suspended above said crops and movable on said track, automatic means for traversing said cage, and brushing means carried by said cage to brush over said crops, said cage being provided with means for attracting and destroying insects.

4. In a device for the protection of crops from the attacks of winged insects and birds, a wire track suspended over the land containing such crops, a cage suspended above said crops and movable on said tracks, automatic means for traversing said cage, and brushing means carried by said cage to brush over said crops, said cage being provided with means for attracting and destroying insects and with means for frightening birds.

5. In a device for the protection of crops from the attacks of winged insects and birds, a wire track suspended over the land containing such crops, a cage suspended above said crops and movable on said track, automatic means for traversing said cage, and brushing means carried by said cage to brush over said crops, said cage being provided with a lamp which co-operates in attracting insects at night and also serves to indicate the position and movements of the cage.

6. In a device for the purposes set forth, a track, a cage having its walls composed mainly of louvres and baffles, means within said cage for destroying insects, brushes on the exterior of said cage to brush plants, and means for moving said cage on said track.

7. In a device for the purposes set forth, a plurality of posts each carrying a pulley, a wire track passing around all of such pulleys, a cage connected with said track, and means for moving said track, said cage having facilities for the access of insects to its interior, odoriferous and poisonous material suspended within said cage, a removable open topped tank within said cage below the location of said odoriferous material, a lamp within said cage, and brushes on the exterior of said cage to brush plants.

JACOB SMITH ROSS.